Oct. 5, 1965   W. F. ULLRICH   3,209,866
AUTOMATIC ADJUSTOR

Filed June 5, 1963   3 Sheets-Sheet 1

INVENTOR
WILLIAM F. ULLRICH
BY *Joseph E. Pajen*

Oct. 5, 1965  W. F. ULLRICH  3,209,866
AUTOMATIC ADJUSTOR

Filed June 5, 1963  3 Sheets-Sheet 3

INVENTOR
WILLIAM F. ULLRICH
BY *Joseph E. Papin*

United States Patent Office 3,209,866
Patented Oct. 5, 1965

3,209,866
AUTOMATIC ADJUSTOR
William F. Ullrich, Hanley Hills, Mo., assignor to Wagner Electric Corporation, St. Louis, Mo., a corporation of Delaware
Filed June 5, 1963, Ser. No. 285,701
21 Claims. (Cl. 188—79.5)

This invention relates to automatic adjustors and in particular to an adjustor cooperable with a radially actuated friction producing element.

A primary object of the present invention is to provide an automatic adjustor of utmost simplicity embodying reliability and accuracy in performance.

Another object of the present invention is to provide an automatic adjustor employed singularly for a single adjustment actuator or in tandem for a double adjustment actuator.

Still another object of the present invention is to provide common resilient actuating means with either the singular or tandem automatic adjustors.

And still another object of the present invention is to provide an automatic adjustor for a friction element, said automatic adjustor having resilient actuating means which does not require balancing against a resilient force imparted to said friction element.

A further object of the present invention is to provide tandem type automatic adjustors for a double ended or double adjustment actuator which are independently operable.

These and other objects and advantages will become apparent hereinafter.

Briefly, the invention embodies adjustment means for predetermining the retracted position of a friction member, and resiliently urged means having a portion for following engagement with said adjustment means and a portion movable upon displacement of said friction member in excess of a predetermined amount for driving adjusting engagement with said adjustment means.

Figure 1:
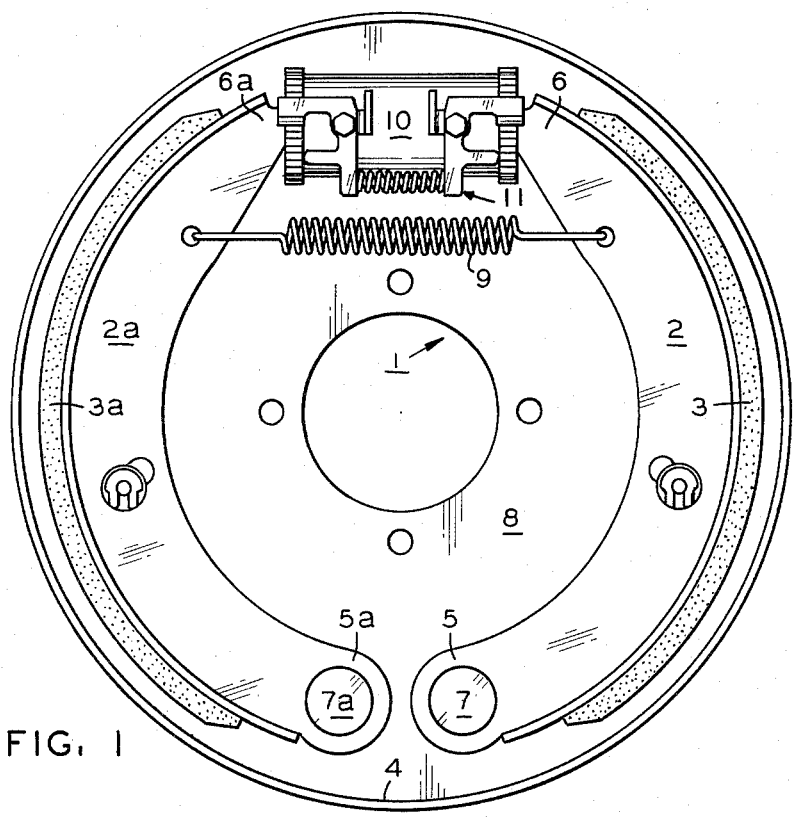
Figure 2:
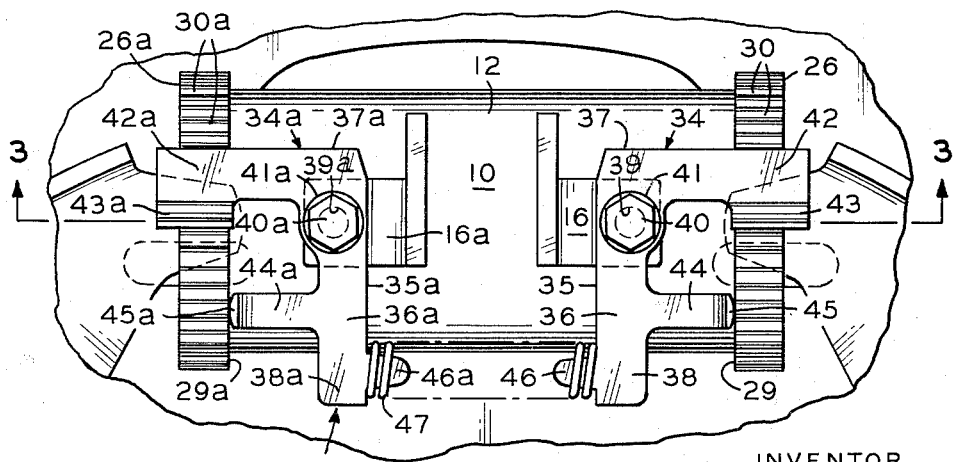
Figure 3:
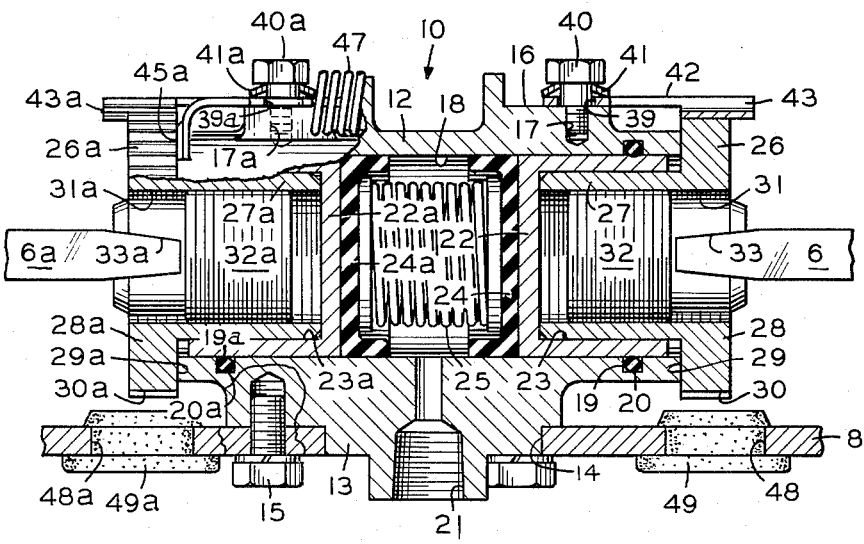
Figure 4:
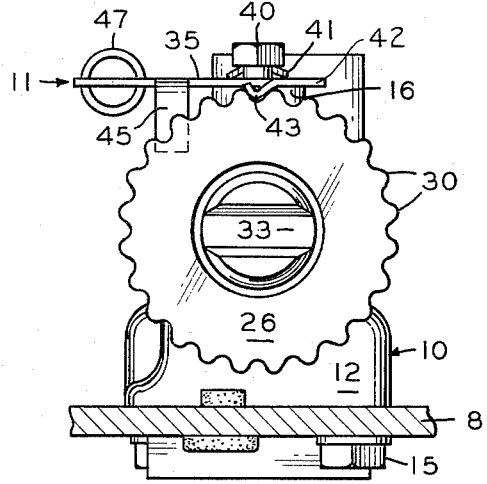
Figure 5:
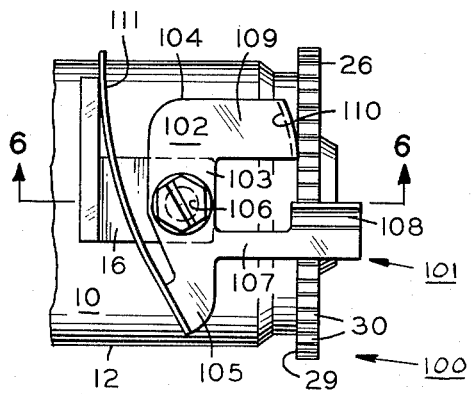
Figure 7:
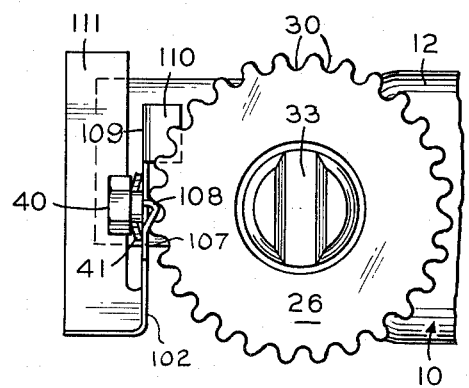
Figure 6:
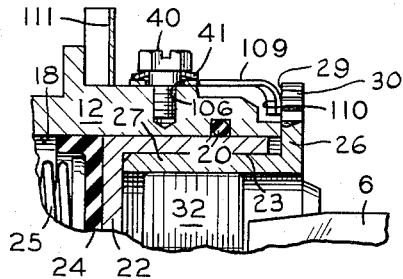

The invention also consists in the parts and arrangements and combination of parts hereinafter described and claimed. In the accompanying drawings which form a part of the specification and wherein like numerals refer to like parts wherever they occur:

FIG. 1 is an elevational view of a friction device brake showing the preferred embodiment of the present invention therein, FIG. 2 is a greatly enlarged fragmentary view of the preferred embodiment of the present invention, as shown in FIG. 1, FIG. 3 is a partial sectional view taken along line 3—3 of FIG. 2, FIG. 4 is a right-end view of the embodiment of FIG. 3, FIG. 5 is a fragmentary view of another embodiment of the present invention, FIG. 6 is a sectional view taken along line 6—6 of FIG. 5, and FIG. 7 is a right-end view of the embodiment of FIG. 5.

A friction device or brake assembly 1, FIG. 1, includes a pair of opposed radially displaceable friction members or brake shoes 2, 2a including friction material or lingings 3, 3a for frictional engagement with a relatively rotatable friction member or drum 4, said shoes having opposed sets of adjacent ends 5, 5a and 6, 6a. The adjacent or anchoring ends 5, 5a of the brake shoes 2, 2a are pivotally associated with spaced anchor members 7, 7a provided on a backing plate or shield 8. A shoe return spring 9 is connected between the brake shoes 2, 2a normally urging the adjacent or displaceable ends 6, 6a of the brake shoes 2, 2a into engagement with an actuator motor or wheel cylinder 10 which includes automatic adjustment means, indicated generally at 11, for maintaining a predetermined clearance between the shoes 2, 2a and the drum 4.

Referring now to FIGS. 2–4 in particular, the wheel cylinder 10 includes a housing 12 having an integral mounting hub portion 13 which protrudes through an annular opening 14 provided in the backing plate 8, and a plurality of attaching means, such as studs 15, fixedly connect said wheel cylinder housing to said backing plate. A pair of spaced bearing surfaces 16, 16a is integrally provided on the housing 12 adjacent to the opposed ends thereof and on the side of said housing opposite to the hub 13. Threaded adjustor mounting apertures 17, 17a are provided in the housing 12 and extend through said bearing surfaces for pivot pin receiving purposes, to be discussed hereinafter. The housing 12 is provided with a bore 18 therethrough having grooves 19, 19a adjacent the open ends thereof in which are received wiper seals 20, 20a to prevent the entry of foreign material into said bore, and said bore is intersected near the mid-portion thereof by a pressure fluid inlet port 21 which extends through the hub 13. Pistons or force receiving members 22, 22a having annular recesses 23, 23a therein are sealably engaged with the seals 20, 20a and are slidably received in the housing bore 18 to close the open ends thereof, and sealing cups 24, 24a are urged into sealing engagement between the bore 18 and the pistons 22, 22a, respectively, by a spring 25. Rotatable adjustable members or starwheel members 26, 26a are provided with axial portions 27, 27a rotatably received in the piston recesses 23, 23a, and radially extending adjustment flanges or starwheels 28, 28a are integrally formed on the outer or free ends of said axial portions being positioned adjacent to the opposed ends of the housing 12. Radially extending abutment shoulders 29, 29a are provided on the starwheel members 26, 26a at the juncture of the axial portions 27, 27a and the adjustment flanges 28, 28a thereof, and axially extending grooves or notches 30, 30a are provided in the peripheral surfaces of the adjustment flanges 28, 28a. Axial threaded bores 31, 31a are also provided through the adjustable members 26, 26a which cooperatively receive threaded extendable members or struts 32, 32a having shoe guide slots 33, 33a in the exterior ends thereof in which the adjacent ends 6, 6a of brake shoes 2, 2a are vertically slidable and retained against lateral displacement. The compressive force of the shoe return spring 9 normally urges the adjacent ends 6, 6a of the brake shoes 2, 2a into engagement with the shoe guide slots 33, 33a which, in turn, serve to bias the shoulders 29, 29a of the starwheel members 26, 26a into abutment with the opposed ends of the wheel cylinder housing 12.

The present invention is primarily concerned with automatic adjustment of the brake shoes 2, 2a upon displacement movement thereof in excess of a predetermined amount relative to the drum 4 to compensate for wear of the shoe linings 3, 3a occasioned during frictional engagement with said drum, and for this purpose, the automatic adjusting means or mechanism 11 is provided. The automatic adjusting mechanism 11 includes driving members or adjustors, indicated generally at 34, 34a, having substantially F-shaped bodies or punchings 35, 35a formed from relatively thin sheet material. The adjustor bodies 35, 35a include base portions or pivot arms 36, 36a having opposed free ends 37, 37a and 38, 38a and pivot apertures or openings 39, 39a are provided in said pivot arms between the mid-portions thereof and the free ends 37, 37a. The bodies 35, 35a are pivotally or rotatably mounted on the spaced bearing surfaces 16, 16a of the wheel cylinder housing 12 by suitable means, such as studs or pivot pins 40, 40a which extend through the pivot apertures 39, 39a of the pivot arms 36, 36a in pivotal bearing engagement therewith, and said pivot pins are cooperatively received against displacement in the threaded mounting apertures 17, 17a provided in said wheel cylinder housing. Spring or deflection washers 41, 41a are received on the pivot pins 40, 40a and are biased between said pivot pins and the pivot arms 36, 36a to normally urge the adjustor bodies 35, 35a into a normal operating plane in bearing engagement with the wheel cylinder housing bearing surfaces 16, 16a while also providing for limited deflection of said adjustor bodies away from said bearing surfaces and out of the normal operating plane. The adjustor bodies 35, 35a are provided with driving or adjusting arms 42, 42a, which are substantially perpendicular to and integrally formed with pivot arms 36, 36a adjacent to the free ends 37, 37a thereof, and depending tooth portions or detents 43, 43a are integrally formed on the free ends of said adjusting arms normally in driving engagement with the notches 30, 30a on the starwheel members 26, 26a. Follower arms 44, 44a are provided in substantially parallel spaced relation with adjusting arms 42, 42a and are integrally formed with pivot arms 36, 36a adjacent to the mid-portions thereof, and depending bearing flanges 45, 45a are integrally formed on the free ends of said follower arms normally in bearing or following engagement with the radial abutment surfaces 29, 29a of starwheel members 26, 26a. To complete the description of the adjustors 34, 34a, spring retaining hubs or receiving arms 46, 46a are integrally formed with the pivot arms 36, 36a adjacent to the free ends 38, 38a thereof extending in a direction substantially opposite the adjusting and follower arms 42, 42a and 44, 44a, and a spring 47 is biased between said pivot arms and is retained against displacement therefrom by said hubs. The spring 47 serves to normally bias or pivot the actuators 34, 34a about the pivot pins 40, 40a to normally urge the bearing flanges 45, 45a on the follower arms 44, 44a in a direction into abutment with the starwheel abutment surfaces 29, 29a and to normally urge the detents 43, 43a on the adjusting arms 42, 42a in a direction toward disengagement from the starwheel notches 30, 30a.

In order to illustrate the operation of the friction device 1 and the adjusting cycle of the adjustment mechanism 11, assume that the friction linings 3, 3a are sufficiently worn to warrant adjustment of said friction device and that the component parts of said friction device and adjustment mechanism are positioned as above described. Fluid pressure transmitted to the bore 18 of the wheel cylinder 10 through the inlet passage 21 from a source of fluid pressure, such as a master cylinder or the like (not shown), acts on the effective area of the sealing cups 24, 24a to establish an actuating force. The actuating force serves to concertly move or displace the sealing cups 24, 24a, the pistons 22, 22a, the starwheel members 26, 26a and the shoe guide members 32, 32a outwardly in the wheel cylinder bore 18 wherein the brake shoes 2, 2a are radially displaced against the compressive force of the shoe return spring 9 to urge the friction linings 3, 3a into frictional engagement with the rotating drum 4 and energize the friction device 1. Of course, the displacement movement of the brake shoes 2, 2a exceeds the aforementioned predetermined amount since it was assumed that an adjustment of the friction device 1 was necessary.

Since it was assumed that the friction linings 3, 3a were sufficiently worn to warrant adjustment of the friction device 1, the compressive force of the adjustment spring 47 pivots the adjustor bodies 35, 35a in opposite directions about the pivot pins 40, 40a to maintain the abutment flanges 45, 45a of the following arms 44, 44a in following engagement or abutment with the abutment shoulders 29, 29a on the starwheel members 26, 26a as said starwheel members are displaced by the actuating force. This pivotal movement of the adjustor bodies 35, 35a about the pivot pins 40, 40a also serves to pivot the adjusting arms 42, 42a so as to pivotally move the detents 43, 43a out of driving engagement with the cooperating starwheel member notches 30, 30a. It should be noted that as the detents 43, 43a are pivotally moved out of driving engagement with the notches 30, 30a, said detents ride up the surfaces of said notches so that the adjustor bodies 35, 35a are slightly deflected out of their normal operating planes or away from the wheel cylinder bearing surfaces 16, 16a against the force of the spring washers 41, 41a, and the force of said spring washers subsequently moves said detents into driving engagement with the next successive starwheel member notches while returning said adjustor bodies to their normal operating planes.

When the friction device 1 is de-energized, the fluid pressure in the wheel cylinder bore 18 is exhausted eliminating the actuating force, and the compressive force of the shoe return spring 9 moves the brake shoes 2, 2a toward their original positions which, in turn, move the shoe guide members 32, 32a, the starwheel members 26, 26a, the pistons 22, 22a and the sealing cups 24, 24a inwardly in the wheel cylinder bore 18 toward their original positions. Since the abutment flanges 45, 45a of the follower arms 44, 44a are biased into abutting or following engagement with the abutment surfaces 29, 29a on the starwheel members 26, 26a, this return movement of said starwheel members pivots the actuator bodies 35, 35a in opposite directions about the pivot pins 40, 40a against the compressive force of the adjustor spring 47 so as to return the adjustors 34, 34a to their original positions. This return pivotal movement of the adjustors 34, 34a serves to pivot the adjusting arms 42, 42a to their original positions, and since the detents 43, 43a are drivingly engaged with the next successive notches 30, 30a in the starwheel members 26, 26a, the return pivotal movement of said adjusting arms adjustably drives or rotates said starwheel members in the recesses 23, 23a of the pistons 22, 22a. Since concert rotation of the shoe guide members 32, 32a with the starwheel members 26, 26a is prevented by the guiding engagement between the slots 33, 33a thereof and the adjacent brake shoe ends 6, 6a, the rotation of the starwheel members 26, 26a effects further threaded engagement between the threaded bores 31, 31a thereof and said guide members to adjustably displace or drive said guide members axially outwardly and adjust the retracted positions of the brake shoes 2, 2a. In this manner, the adjustable axial displacement of the guide members 32, 32a effectively moves or spreads the adjacent shoe ends 6, 6a apart to again reposition the friction linings 3, 3a on the brake shoes 2, 2a relative to the drum 4 and thereby adjust the friction device 1. Continued wear of the friction linings 3, 3a will, of course, occasion further adjustment of the friction device 1 by the automatic adjustment mechanism 11 in the same manner as previously described.

It should be noted that the adjustors 34, 34a of the automatic adjusting mechanism 11 are independently operable to effect adjustment of its associated brake shoe relative to the drum 4. In other words, if one of the friction linings 3, 3a is sufficiently worn to warrant adjustment of one of the brake shoes 2, 2a while the other of said friction linings is not sufficiently worn to warrant adjustment of the other of said brake shoes, the adjustor 34 or 34a associated with said one brake shoe having the worn lining will function as above described to effect adjustment; however, it is apparent that the adjustor associated with said other brake shoe on which the friction lining is not sufficiently worn to warrant adjustment will not be pivoted enough to drivingly engage the next successive starwheel notch to effect adjustment.

The friction device 1 may also be manually adjusted, and for this purpose access apertures or openings 48, 48a, FIG. 3, are provided through the backing plate 8 substantially in alignment with the starwheel flanges 28, 28a, and resilient closure members 49, 49a are normally removably secured in said access openings to prevent the entry of foreign material into the interior of said friction device. Removal of the resilient closure members 49, 49a permits the manual insertion of an adjusting tool, such as a screwdriver or the like (not shown), through the access openings 48, 48a into manual driving engagement with the notches 30, 30a of the starwheel members 26, 26a to rotate said starwheel member and effect adjustment of the brake shoes 2, 2a relative to the drum 4, as previously described. The resiliency of the spring washers 41, 41a permits deflection of the adjustors 34, 34a in order to acomplish the manual adjustment, and such resiliency causes the detents 43, 43a to re-engage the starwheel notches 30, 30a when the manual adjustment is completed.

Referring now to FIGS. 5 and 6, a modified adjustor 101 is shown on the wheel cylinder 10 having substantially the same component parts and functioning in substantially the same manner in the friction device 1 as the previously described adjustors 34, 34a. The adjustor 101 is provided with a substantially F-shaped body or punching 102 formed from relatively thin sheet material. The adjustor body 102 includes a base portion or pivot arm 103 having opposed ends 104 and 105, and a pivot aperture or opening 106 is provided through said pivot arm adjacent to the mid-portion thereof. The adjustor body 102 is pivotally or rotatably mounted on the wheel cylinder bearing surface 16 being received on the pivot pin 40 which extends through the pivot aperture 106, and the spring washer 41 serves to normally urge said adjustor body into a normal operating plane in bearing engagement with said wheel cylinder bearing surface while also providing for limited deflection of said adjustor body away from said bearing surface and out of the normal operating plane. The adjustor body 102 is provided with a driving or adjusting arm 107 which is substantially perpendicular to and integrally formed with the pivot arm 103 between the mid-portion thereof and the end portion 105, and a depending tooth portion or detent 108 is integrally formed on the free end of said driving arm normally in driving engagement with the notches 30 on the starwheel member 26. A follower arm 109 is provided in substantially parallel spaced relation with the driving arm 107 and is integrally formed with the pivot arm 103 adjacent to the end portion 104 thereof, and a depending bearing flange 110 is integrally formed on the free end of said follower arm normally in bearing or following engagement with the abutment surface 29 of the starwheel member 26. To complete the description of the adjustor 101, a resilient leaf spring member 111 is connected with the pivot arm 103 adjacent to the end portion 105 thereof, and said leaf spring member is normally biased into abutment with a portion of the wheel cylinder housing 12. The resiliency of the leaf spring 111 serves to normally bias or pivot the adjustor 101 about the pivot pin 40 to urge the follower arm flange 110 in a direction into abutment with the starwheel flanges abutment surface 29 and to urge the driving arm 107 in a direction to disengage the detent 108 thereof from the starwheel notch 30.

It is apparent to those skilled in the art that the adjusting mechanisms 11 and 100 or the adjustors 34, 34a and 101 are not necessarily restricted or limited for use with the particular type or geometric configuration of the friction device 1 which is shown and described herein only for purposes of illustration. Further, the fluid pressure responsive wheel cylinder 10 is shown and described in conjunction with the adjustors 34, 34a and 101 only for purposes of illustration, and it is also apparent to those skilled in the art that other means such as cams, wedges and rollers, or like mechanical means well known in the braking art, may be employed to impart the actuating force which energizes the friction device. From the foregoing, it is now apparent that novel automatic adjusting means for a friction device meeting the objects set out hereinbefore are provided and that changes or modifications as to the precise configurations, shapes or details of the construction set forth in the disclosure by way of illustration may be made by those skilled in the art without departing from the spirit of the invention as defined by the claims which follow.

What I claim is:

1. In a friction device having a pair of relatively displaceable friction members adapted for energization into frictional engagement, extendable adjustment means engaged with one of said friction members for concert displacement therewith upon energization of said friction members into frictional engagement and normally defining the retracted position of said one friction member including wheel means rotatable to extend said adjustment means and adjust the retracted position of said one friction member, adjustor means pivoted on a fixed portion of said friction device, a follower arm on said adjustor means urged into engagement with said adjustment means to permit pivotal movement of said adjustor means in one direction in response to the displacement movement of said adjustment means and to pivot said adjustor means in an opposite direction in response to the return movement of said adjustment means toward the retracted position upon de-energization of said friction members, and a driving arm on said adjustor means adapted for driving engagement with said wheel means, said driving arm being pivoted with said adjustor means in response to the return movement of said adjustment means into driving engagement with said wheel means to effect rotation thereof and etxend said adjustment means to adjust the retracted position of said one friction member.

2. In a friction device having a pair of relatively displaceable friction members adapted for energization into frictional engagement, extendable adjustment means engaged with one of said friction members for concert movement therewith upon energization of said friction members into frictional engagement and normally defining the retracted position of said one friction member, said adjustment means including wheel means having an irregular peripheral portion and being rotatable to controllably extend said adjustment means and adjust the retracted position of said one friction member, resilient means normally urging said one friction member into engagement with said adjustment means toward the retracted position, adjustor means pivotally supported on a fixed portion of said friction device, a follower portion on said adjustor means including flange means for engagement with said adjustment means, other resilient means connected with said adjustor means and urging said flange means into engagement with said adjustment means, said other resilient means serving to pivot said adjustor means in one direction upon the displacement movement of said adjustment means and one friction member, said first named resilient means serving to return said one friction member and said adjustment means toward the retracted position upon the de-energization of said friction members, said adjustor means being pivoted in a direction opposite to the one direction in response to the return movement of said adjustment means toward the retracted position, a driving portion on said adjustor means including detent means adapted for driving engagement with the peripheral portion of said wheel means, and means translating displacement movement of said friction member into displacement of said adjustor means to drivingly engage said detent means with a successive portion of said wheel means peripheral portion and adjustably rotate said wheel means to extend said adjustment means and adjust the retracted position of said one friction member in response to the pivotal movement of said adjustor means in the opposite direction.

3. In combination, a friction device having at least one friction member movable between a normal retracted position and a displaced position in frictional engagement with a friction producing element, cylinder means positioned on said friction device adjacent to said friction member, force responsive means movable in said cylinder means for moving said friction member to the displaced position, adjustment means connected between said force responsive means and friction member for concert movement therewith including an extendable strut defining the retracted position of said friction member and a rotatable member rotatably received in said force responsive means for controlling the extension of said strut and adjusting the retracted position of said friction member, said rotatable member having an irregular periphery, resilient means urging said friction member into engagement with said strut, resiliently urged means pivotally supported on said cylinder means including means urged into abutment with said adjustable means to effect pivotal movement of said resiliently urged means in opposite directions upon movement of said friction member between the retracted and displaced positions and driving means adapted for engagement with the peripheral portion of said rotatable member, and means for translating pivotal movement of said resiliently urged means in one direction in response to the displacement movement of said one friction member into deflection of said resiliently urged means to drivingly engage said driving means with a successive portion of the periphery of said rotatable member, said resiliently urged means being pivoted in the direction opposite the one direction in response to movement of said friction member toward the retracted position to move said driving means and adjustably rotate said rotary member to thereby extend said strut and adjust the retracted position of said friction member.

4. In combination, a friction device having at least one friction member movable between a normal retracted position and a displaced position in frictional engagement with a friction producing element, said friction member having opposed anchoring and displaceable end portions, a cylinder mounted on said friction device adjacent to the displaceable end of said friction member, force responsive means movable in said cylinder for urging said friction member to the displaced position, adjustment means interconnected between said force responsive means and the displaceable end portion of said friction member for concert movement therewith including an extendable strut defining the retracted position of said friction member, and a rotatable member rotatably received in said force responsive member, said rotatable member having a notched peripheral surface and being threadedly engaged with said strut to control the extension thereof, resilient means urging said friction member toward the retracted position into engagement with said strut, lever means pivotally supported on said cylinder including driving means adapted for engagement with the notched peripheral surface of said rotatable member, an abutment portion on said lever means for following engagement with said rotatable means, other resilient means normally urging said abutment portion into following engagement with said rotatable member and disengaging said driving means from the notched periphery of said rotatable member upon the concert movement of said adjustment means and friction member to the displaced position, and means translating the displacement movement of said friction member greater than a predetermined amount into deflection movement of said lever means to engage said driving means with a successive notch on the periphery of said rotatable member, said lever means being pivoted in response to the return movement of said friction member and adjustment means to the retracted position to move said driving means and adjustably rotate said rotatable member into further threaded engagement with said strut thereby extending said strut to adjust the retracted position of said friction member.

5. In combination, a friction device having at least one friction member movable between a normal retracted position and a displaced position in frictional engagement with a friction producing element, cylinder means secured to said friction device adjacent to said friction member, force responsive means movable in said cylinder means for moving said friction member to the displaced position, adjustment means connected between said force responsive means and friction member for concert movement therewith including an extendable strut defining the retracted position of said friction member and a rotatable member rotatably received on said force responsive means, said rotatable member being threadedly engaged with said strut and having a notched peripheral surface, resilient means urging said friction member toward the retracted position into engagement with said strut, adjustor means pivotally supported on said cylinder means, a follower arm on said adjustor means, other resilient means connected with said adjustor means to urge said follower arm into engagement with said adjustment means and to pivot said adjustor means in one direction in response to the displacement movement of said adjustment means and friction member, said first named resilient means serving to retractively move said adjustment means and friction member toward the retracted position and pivot said adjustor means in the opposite direction, a driving arm on said adjustor means including detent means normally engaged with a notch on the peripheral surface of said rotatable member, deflection means connected with said adjustor means to engage said detent means with the next successive notch on the periphery of said rotatable member upon pivotal movement of said adjustor means in the one direction greater than a predetermined amount, said driving arm being pivoted with said adjustor means in the opposite direction in response to the retractile movement of said adjustment means and friction member to rotatably adjust said rotatable member into further threaded engagement with said strut thereby extending said strut to adjust the retracted position of said friction member.

6. In combination, a friction device having a pair of friction members movable between normal retracted positions and displaced positions in frictional engagement with a friction producing element, said friction members having an adjacent pair of expansible ends and an adjacent pair of anchored ends, a cylinder secured to said friction device and having opposed ends thereon adjacent to the expansible ends of said friction members, a pair of opposed piston means slidable in said cylinder and movable in response to an applied force to move said friction members to their displaced positions, a pair of adjustment means connected between said piston means and expansible ends of said friction members for concert movement therewith, said adjustment means respectively including extendable struts engaged with the expansible ends of said friction members and defining the retracted position of said friction members, annular rotary members rotatable in said piston means and threadedly engaged with said struts to control the extension thereof and adjust the retracted position of said friction members, radially extending abutment surfaces on said rotary members normally engaged with the opposed ends of said cylinder, and a notched peripheral surface on said rotary member, resilient means urging said friction members toward their retracted positions to maintain said expansible ends in engagement with said struts and normally maintain said rotary member abutment surfaces in engagement with the opposed ends of said wheel cylinder, a pair of adjustors pivotally supported on said cylinder adjacent to the opposed ends thereof, follower arms on said adjustors including flanges for following engagement with said rotary member abutment surfaces, respectively, other resilient means connected with said adjustors and urging said flanges into following engagement with said rotary member abutment surfaces, said other resilient means serving to pivot said adjustors in one direction upon the displacement movement of said adjustment means and friction members, said first named resilient means serving to return said adjustment means and friction members toward the retracted positions upon removal of the applied force on said piston means, said adjustors being pivoted in a direction opposite to the one direction in response to the return movement of said adjustment means and friction members, driving arms on said adjustors including detent means normally engaged with one of the notches on the peripheral surfaces of said rotary members, respectively, and means respectively connected with said adjustors to translate displacement movement of said friction members in excess of a predetermined amount into displacement of said adjustors so as to engage said detent means with the next successive notches on the peripheral surfaces of said rotary members, said driving arms being pivoted with said adjustors in the direction opposite said one direction in response to the return movement of said adjustment means and friction members to rotatably adjust said rotary members into further threaded engagement with said struts thereby extending said struts to adjust the retracted positions of said friction members.

7. In a friction device having a pair of relatively movable friction members adapted for displacement and retractile movement into and out of frictional engagement, extendable adjustment means engaged for concert displacement and retractile movement with one of said friction members and adapted to adjust the relative displacement between said friction members to compensate for friction member wear occasioned upon frictional engagement including actuating means rotatably driven relative to said one friction member to extend said adjustment means to adjustably reposition said one friction member and adjust the relative displacement between said friction members, and resiliently urged means pivotally supported on said friction device for driving engagement with said actuating means including abutment means urging said adjustment means toward engagement with said one friction member and serving to translate the displacement and retractile movement thereof into pivotal movement of said resiliently urged means, said resiliently urged means being pivotally movable in response to the retractile movement of said one friction member into driving engagement with said actuating means to effect the adjusting rotation thereof and extend said adjustment means to adjustably reposition said one friction member with respect to the other of said friction members and thereby adjust the relative displacement therebetween.

8. In the friction device according to claim 7 wherein said resiliently urged means comprises a body portion including spaced driving and abutment members extending therefrom in substantially the same direction for driving engagement with said actuating means and for abutting engagement with said adjustment means, respectively.

9. In the friction device according to claim 8 including spring means integrally formed with said body portion and engaged with a portion of said friction device to urge said abutment member into abutting engagement with said adjustment means.

10. The friction device according to claim 8 including a curved abutment surface on the free end of said abutment member for engagement with said adjustment means.

11. The friction device according to claim 8 including a mounting aperture in said body portion, and a pivot pin connected to a fixed portion of said friction device and extending through said aperture in pivotal bearing engagement with said body portion.

12. In the friction device according to claim 8 including resilient means engaged with said body portion for urging said abutment member into abutting engagement with said adjustment means.

13. In the friction device according to claim 12 including a retainer portion on said body portion and extending therefrom into displacement preventing engagement with said resilient means.

14. In a friction device having a friction member adapted for displacement and retractile movement relative to a coacting member to respectively effect frictional energization and de-energization of said friction device, adjustable means including an extendable strut and a rotatable wheel member for controlling the extension of said strut and having an irregular peripheral portion, resilient means normally urging said friction member for retractile movement out of frictional engagement with said coacting member to a retracted position in engagement with said strut, force responsive means for displaceably moving said adjustable means and friction member against said resilient means to a displaced position in frictional engagement with said coacting member, lever means pivoted on a fixed portion of said friction device and adapted for driving engagement with the peripheral portion of said wheel member including motion translating means engaged with said adjustable means to translate displacement and retractile movement thereof with said friction member into pivotal displacement in one direction and a direction opposite to the one direction of said lever means, respectively, other resilient means connected with said lever means normally urging said motion translating means into engagement with said adjustable means in opposition to said first named resilient means, and other motion translating means for translating pivotal displacement in the one direction of said driven means in excess of a predetermined amount into other displacement of said lever means to urge said lever means into driving engagement with a successive portion of the periphery of said wheel member, said lever means being thereafter pivotally displaced in the opposite direction to rotate said wheel member and extend said strut to adjust the retracted position of said friction member toward said coacting member.

15. In the friction device according to claim 8 wherein said irregular peripheral portion of said wheel member includes a plurality of successive grooves, and a depending tooth portion on said lever means for engagement with said grooves.

16. In a friction device having a pair of relatively displaceable friction members adapted for energization into frictional engagement, extendable adjustment means movably supported on said friction device for displacement movement with one of said friction members upon energization of said friction members into frictional engagement and defining the retracted position of said one friction member including rotatable means rotatably driven to control extension of said adjustment means and adjust the retracted position of said one friction member, and resiliently urged adjustor means pivotally supported on said friction device including following means urged toward engagement with said adjustment means to provide pivotal movement in one and opposite directions of said adjustor means in response to the displacement movement of said adjustment means with said one friction member and the retractile movement thereof toward the retracted position of said one friction member, respectively, and driving means on said adjustor means pivotally movable therewith in the one direction to a position in driving engagement with said rotatable means and pivotally movable therewith in the opposite direction to drivingly rotate said rotatable means and extend said adjustment means to adjust the retracted position of said one friction member.

17. In a friction device having a friction member for displacement and retractile movement between a retracted position and a displaced position in frictional engagement with a coacting member, extendable adjustment means engaged for concert movement with said friction member and defining the retracted position thereof including rotatable means for controlling extension of said adjustment means to adjust the retracted position of said friction member, and resiliently urged driving means pivotally mounted on said friction device for driving engagement with said rotatable means including motion translating means urged toward engagement with said adjustment means for translating displacement and retractile movement of said friction member into pivotal movement of said driving means, said driving means being pivoted in response to retractile movement of said friction member into driving engagement with said rotatable means to effect rotation thereof and extend said adjustment means to adjust the retracted position of said friction member.

18. In a friction device having a pair of friction members adapted for relative displacement movement into frictional engagement upon energization of said friction device, means responsive to predetermined maximum displacement movement between said friction members to effect relative adjustment of said friction members to positions defining a predetermined minimum amount of displacement movement therebetween to compensate for friction member wear occasioned upon friction device energization comprising extendable adjustment means movably supported on said friction device and engaged for displacement movement with one of said friction members upon friction device energization and for retractile movement therewith upon friction device de-energization including means rotatable relative to said one friction member to extend said adjustment means and move said one friction member to an adjusted position providing the predetermined minimum amount of displacement movement between said friction members, and resiliently urged control means pivotally supported on said friction device including driving means for driving engagement with said rotatable means and means urged into following engagement with said adjustment means for translating the displacement and retractile movement thereof with said one friction member into pivotal displacement of said control means, said driving means being pivotally displaced with said control means upon the maximum displacement movement of said one friction member to drivingly engage and thereafter rotate said rotatable means upon friction device de-energization to extend said adjustment means and move said one friction member to the adjusted position thereof.

19. In a friction device, adjustment means for adjustably maintaining between predetermined maximum and minimum limits the displacement movement between a friction member and a coacting member of said friction device to compensate for friction member wear occasioned upon displacement movement of said friction member into frictional engagement with said coacting member including extendable means engaged for displacement and retractile movement with said friction member, driven means for controlling extension of said extendable means to adjustably reposition said friction member relative to said coacting member, and resiliently urged driving means pivotally supported on said friction device for driving engagement with said driven means including means urged into engagement with said adjustment means for translating displacement and retractile movement thereof with said friction member into pivotal displacement of said driving means, said driving means being pivotally displaced upon maximum displacement movement of said friction member to engage and thereafter drive said driven means upon retractile movement of said friction member to extend said extendable means and adjustably reposition said friction member relative to said coacting member to effect the predetermined minimum displacement therebetween.

20. In a friction device having a friction member adapted for displacement movement into frictional engagement with a coacting member, adjustment means movably supported on said friction device and responsive to the displacement movement of said friction member from a position defining a predetermined maximum displacement between said friction and coacting members into frictional engagement with said coacting member to adjustably move said friction member to a position defining a predetermined minimum displacement between said friction and coacting members to compensate for friction member wear occasioned upon frictional engagement comprising extendable means engaged for displacement movement and retractile movement opposite the displacement movement with said friction member, driven means engaged with said extendable means and rotatable to effect extension thereof and adjust said friction member toward said coacting member from the maximum displacement position to the minimum displacement position thereof, and resiliently urged driving means pivotally supported on said friction device including means urged toward engagement with said adjustment means for translating displacement movement thereof with said friction member into pivotal displacement of said driving means in one direction and for translating retractile movement of said adjustment means with said friction member into pivotal displacement of said driving means in a direction opposite to the one direction, said driving means being pivotally displaced in the one direction upon displacement movement of said friction member from the maximum displacement position thereof into driving engagement with said driven means and thereafter pivotally displaced in the opposite direction upon retractile movement of said friction member to drivingly rotate said driven means and extend said extendable means thereby effecting adjustment of said friction member to the minimum displacement position thereof.

21. In a friction device having a friction member for displacement and retractile movement between a retracted position and a displaced position in frictional engagement with a coacting member, adjustable means movably supported in said friction device and engaged for concert movement with said friction member, said adjustable means defining the retracted position of said friction member and being rotatably driven relative to said friction member to adjust the retracted position thereof, and motion translating means pivotal in opposite directions in response to displacement and retractile movement of said friction member including resiliently urged means for driving engagement with said adjustable means pivotally supported on said friction device and also including means urging said adjustable means toward engagement with said friction member, said resiliently urged means being pivotally movable in one direction to a position in driving engagement with said adjustable means and in the opposite direction to rotatably drive said adjustable means and adjust the retracted position thereof.

References Cited by the Examiner

UNITED STATES PATENTS

| | | | |
|---|---|---|---|
| 1,971,643 | 8/34 | De Lavaud | 188—79.5 |
| 2,224,197 | 12/40 | Schlueter | 188—79.5 |
| 2,389,618 | 11/45 | Goepfrich | 188—79.5 |
| 2,669,327 | 2/54 | Chamberlain et al. | 188—72 |
| 3,103,992 | 9/63 | Dombeck | 188—196 X |
| 3,158,234 | 11/64 | Henderson | 188—196 |

ARTHUR L. LA POINT, *Primary Examiner.*

DUANE A. REGER, *Examiner.*